Nov. 6, 1956 A. BLOCK ET AL 2,769,344

REMOTE CONTROL MECHANISM FOR TELEVISION RECEIVERS

Filed April 27, 1953 2 Sheets-Sheet 1

INVENTORS
ALECK BLOCK
ALBERT MANNHEIMER
BY Lyon & Lyon
ATTORNEYS

REMOTE CONTROL MECHANISM FOR TELEVISION RECEIVERS

Filed April 27, 1953 2 Sheets-Sheet 2

INVENTORS
ALECK BLOCK
ALBERT MANNHEIMER
BY Lyon & Lyon
ATTORNEYS 2,769,344
Patented Nov. 6, 1956

2,769,344

REMOTE CONTROL MECHANISM FOR TELEVISION RECEIVERS

Aleck Block and Albert Mannheimer, Los Angeles, Calif.

Application April 27, 1953, Serial No. 351,372

10 Claims. (Cl. 74—10.15)

Our invention relates to remote control mechanisms for television receivers, and the objects of our invention are:

First, to provide a mechanism of this class which is attached to the station selector shaft of a television receiver and which includes a control cord so arranged that when pulled the shaft is advanced from station to station so that one seated several feet from the television receiver may change stations.

Second, to provide a mechanism of this class which does not in any way interfere with the conventional or direct manual operation of the selector shaft dial.

Third, to provide a mechanism of this class which is particularly compact, and simple to install.

Other objects and advantages of our invention will be apparent from the following detailed description of a preferred embodiment thereof, as illustrated in the accompanying drawings in which.

Reference is first directed to Figures 1–5.

Figures 1, 2, 3, 4, 5:
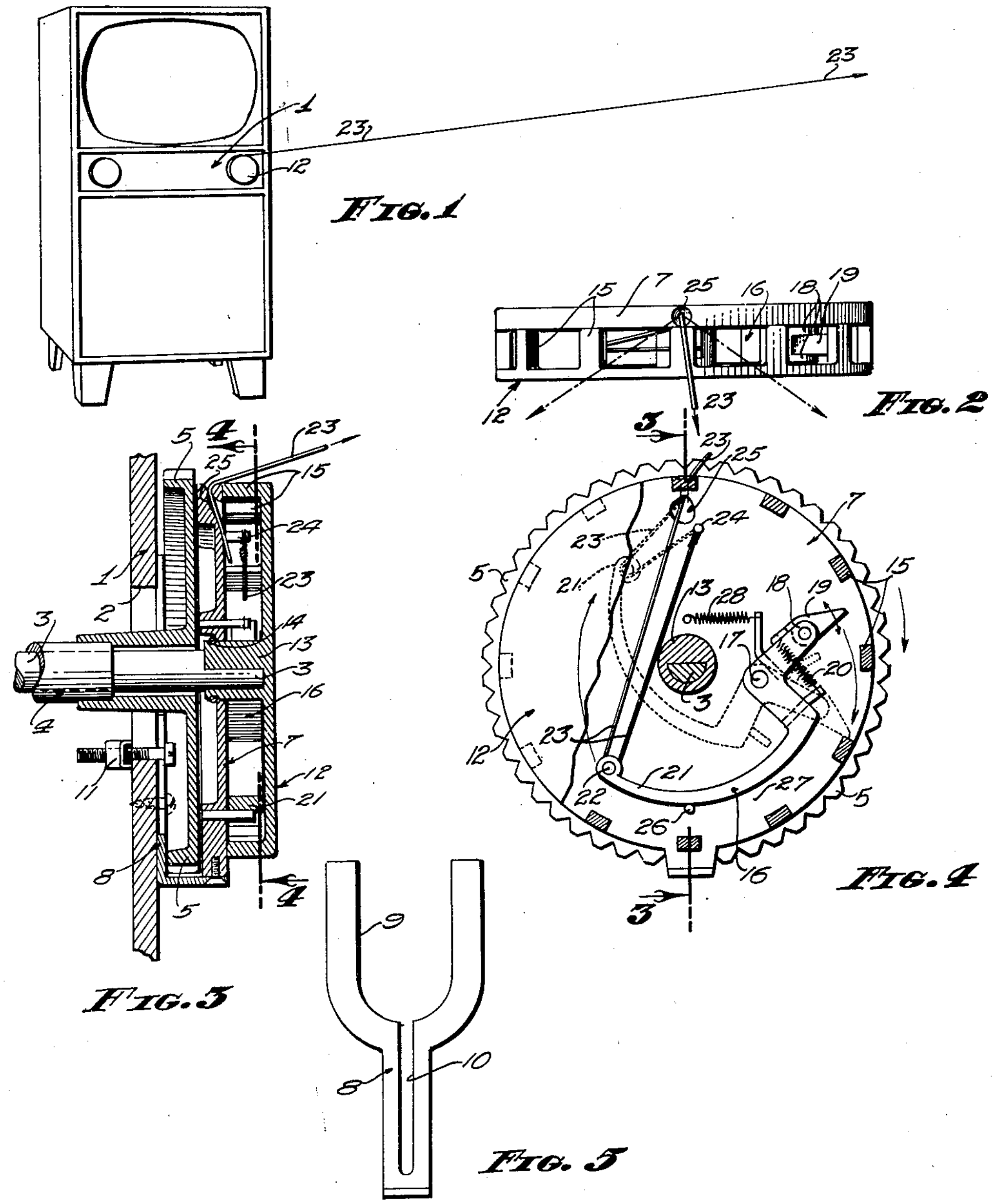
Figure 1 is a perspective view of a television receiver with our remote control mechanism shown thereon.
Figure 2 is a top or edge view of our remote control mechanism.
Figure 3 is a vertical sectional view thereof taken through 3—3 of Figure 4 showing adjacent portions of the television receiver panel and station selector shaft fragmentarily and indicating a contrast or similar control interposed between our mechanism and the television receiver.
Figure 4 is a sectional view of our remote control mechanism taken through 4—4 of Figure 3.
Figure 5 is an elevational view of the mounting bracket employed in connection with our remote control mechanism.
Figure 7:
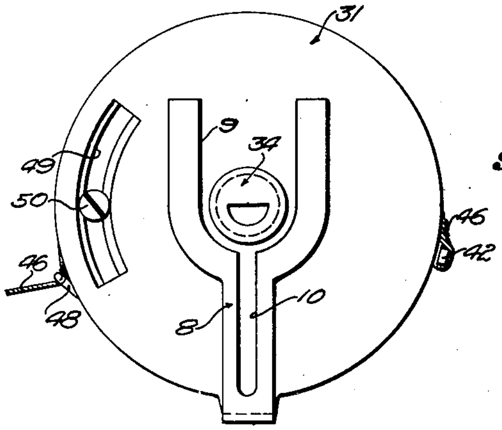
Figure 7 is a back view thereof.
Figure 6:
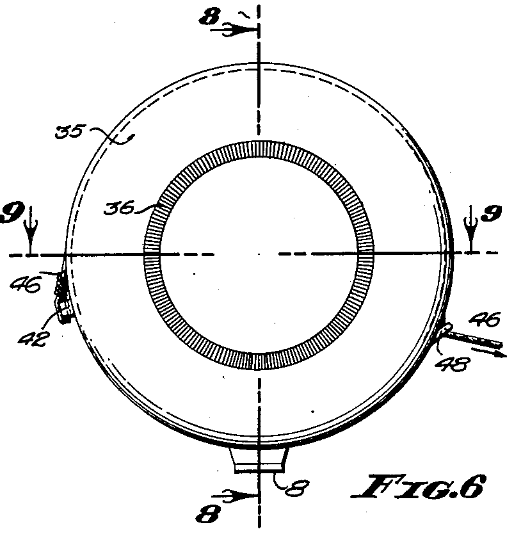
Figure 6 is a front view of a modified form of our remote control mechanism.
Figures 8, 9:
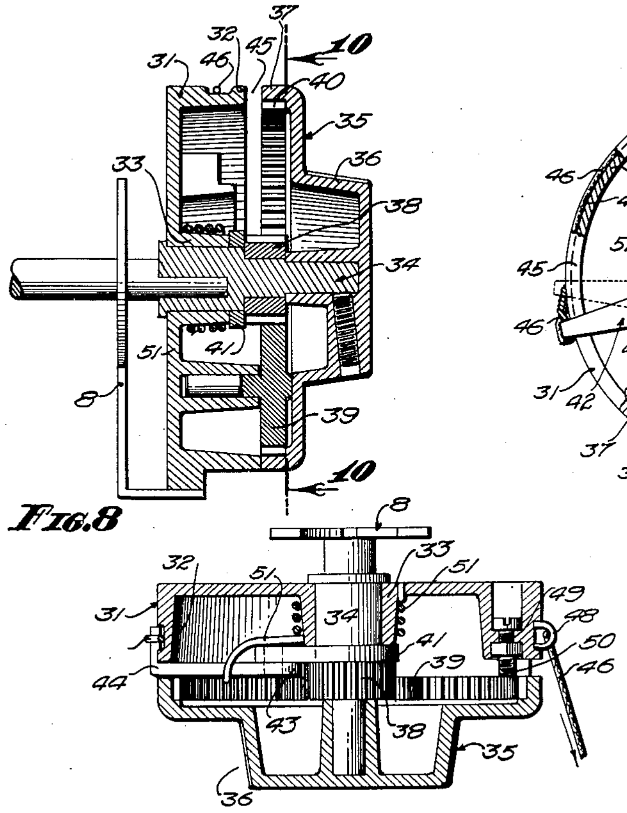
Figure 8 is a transverse sectional view thereof taken through 8—8 of Figure 6.
Figure 9 is another transverse sectional view taken through 9—9 of Figure 6.

As shown in Figure 3, the front panel 1 of a television receiver is provided with an aperture 2 through which extends a station selector shaft 3. Usually this shaft fits within a sleeve 4 which controls some other function of the television receiver, for example, the contrast.

Mounted on the sleeve 4 is a suitable adjustment wheel or disk 5. Our remote control mechanism is mounted on the shaft 3 in front of the wheel 5 and includes a fixed base disk or housing 7 slightly smaller than the wheel 5. At one point in its periphery the disk 7 may be provided with a small boss for attachment to an anchor bracket 8. The anchor bracket 8 extends horizontally from the disk across the rim of the wheel 5 and then is bent at right angles to overlie the front panel 1 behind the wheel. The anchor bracket may terminate in a hook 9 to clear the shaft 3.

A slot 10 is provided which receives an expansion or wing bolt and nut 11, which are adapted to be placed adjacent the margin of the aperture 2, or if desired, a wood screw or the like may be secured directly into the front panel in order to hold the bracket in place.

A control disk or housing 12 having a central hub 13 is fastened to the extremity of the station selector shaft 3. The hub extends within a central aperture in the fixed base disk 7 and the base disk is retained on the hub by a retainer ring 14 which permits rotation of the hub 13 and control disk 12.

The control disk 12 is provided with a ring of axially directed ribs 15 around its periphery, the extremities of which ride on the periphery of the fixed disk 7.

A control lever 16 is disposed between the fixed disk and the control disk and is mounted on a pivot pin 17 extending from the fixed disk. The control lever is provided with an arm 18 at the extremity of which is pivotally mounted a dog 19 yieldably held in its extended position by a spring 20. The control lever also includes a relatively long curved pull arm 21, the extremity of which is provided with a sheave pin 22. A pull cord 23 is secured to an anchor pin 24 located near the upper portion of the fixed disk and is threaded through the sheave pin, then outwardly through an eyelet 25 formed in the rim of the fixed disk 7. The eyelet is directed radially outwardly so that the cord may be brought outside the fixed disk and may extend therefrom either forwardly or outwardly from the television receiver so that one viewing the receiver may pull on the extremity of the cord and thus pivot the control lever 16.

The movement of the control lever is limited by a stop pin 26 and by a stop screw 27 carried by the pull arm 21 and engageable with the hub 13 of the control disk 12. A spring 28 returns the control lever to an initial position determined by the stop pin 26.

Operations of our remote control mechanism is as follows:

The pull cord is extended from the television receiver to any desired location in viewing range of the receiver. When the cord 23 is pulled the control lever 16 moves from its solid line position to its dotted line position shown in Figure 4. Initial movement of the control lever moves the dog 19 into position for engagement with one of the ribs 15. Continued movement causes the dog to urge the control disk 12 clockwise as viewed in Figure 4, to thereby advance the station selector shaft 3 the appropriate angular distance required to shift from one station to the next. When the pull cord is released the spring 28 returns the control lever 16 to its original position. The dog being yieldable by reason of the spring 20, rides past the succeeding rib of the control disk.

It will be observed that when the control lever is in its normal or solid line position shown in Figure 4 the dog 19 clears the ribs 15 so that the control dial or disk 12 may be directly engaged manually for the purpose of changing stations without interference in any way with or by the remote control mechanism.

The number of ribs 15 provided in the control disk 12 is, of course, determined by the number of stations for which the television receiver is designed. Thus, in the construction illustrated, the remote control mechanism is arranged for operating a 12-station receiver. If the number of stations differ from this, the control disk with the appropriate number of ribs is substituted.

Reference is now directed to Figures 6–10.

This construction includes a fixed housing 31 in the form of a disk with an axially outwardly directed rim 32, The housing is provided with a central bushing 33 in which journals a shaft extension 34 adapted to be secured to the station selector shaft 3.

The extremity of the shaft extension receives a rotatable housing 35. The central portion is shaped to form a dial knob 36. The housing extends radially from the knob portion 36 and forms an axially directed rim 37 confronting the rim 32. Mounted on the shaft extension between the two housings is a pinion gear 38 which engages an idler gear 39 supported from the fixed housing 31.

The idler gear in turn engages an internal gear 40 formed within the rim 37. Also journaled on the shaft extension 34 is a collar 41 having a radially projecting arm to which is pivotally attached a lever 42. The lever 42 includes a dog arm 43 adapted to engage the pinion gear 38 and a radially extending pull arm 44 which projects through a slot 45 formed between the two housings 31 and 35. The extremity of the pull arm 44 is bent to overlie the rim 32 of the fixed housing. Attached to the extremity of the pull arm is a pull cord 46 which is adapted to wrap partially around the rim 32 and be retained by a groove 47 formed therein.

The slot 45 occupies something in excess of half the circumference of the housing and the pull arm normally occupies a position engaging one circumferential extremity of this slot. Adjacent the opposite extremity of the slot there is provided an eyelet 48 through which the cord 46 extends. Adjacent this end of the slot 45 the back wall of the fixed housing 31 is provided with an arcuate slot 49 which receives an adjustable stop screw 50 so disposed as to project into the fixing housing in the back of the pull arm 44.

Figure 10:
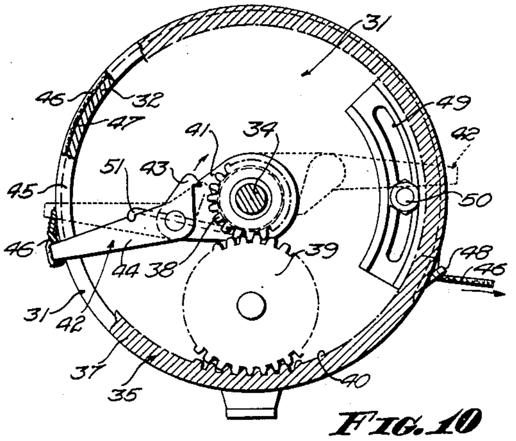
Figure 10 is a sectional view thereof taken through 10—10 of Figure 8.

A return spring is coiled about the bushing 33 and its end arranged to engage the collar 41 and fixed housing so as to urge the lever 42 to the solid line position shown in Figure 10 wherein the pull arm 44 bears against the extremity of the slot 45 opposite the eyelet 48.

Operation of our remote control mechanism disclosed in Figures 6–10 is as folows:

The gear ratio between the pinion gear 38 and the internal gear 40 is such that the pinion gear undergoes a half revolution or better in order to advance the rotatable housing 35 a distance equal to the relatively angular position between succeeding stations. The stop screw 50 is set so that the angular movement imparted to the rotatable housing corresponds to the number of stations for which the television receiver is designed; that is, the stop screw may be adjusted to enable the remote control device to operate a 12-station receiver or a 16-station receiver, as the case may be. When the extremity of the cord 46 is pulled the lever 42 first pivots to bring the dog arm 43 into engagement with the pinion gear. Thereupon the lever 42, collar 41 and pinion gear 38 rotate as a unit and cause corresponding but lesser rotation of the housing 35 and station selector shaft 3. When the cord is released the lever returns to its initial position.

It will be observed that the slot 49 may be extended so that the travel of the lever 42 may be further reduced with the result that a larger number of stations may be controlled by our device. Thus, the device can be adjusted to operate television receivers having a few stations or a large number of stations without altering the construction of our device.

Having fully described our invention, it is to be understood that we do not wish to be limited to the details herein set forth, but our invention is of the full scope of the appended claims.

We claim:

1. A remote control mechanism for the station selector shaft of a television receiver, comprising: a fixed member surrounding said shaft and restrained against rotation; a rotatable member mounted on said shaft outwardly of said fixed member and defining therewith a housing, said rotatable member being manually engageable to operate said shaft; means within said housing operate to turn said rotatable member predetermined amount relative to said fixed member, thereby to advance said station selector shaft from station-to-station; and a pull cord attached to said means to operate said means from a remote point.

2. A remote control mechanism for the station selector shaft of television receivers wherein said shaft protrudes from the receiver cabinet through a control disk, said mechanism comprising: a bracket adapted for attachment to said television receiver cabinet behind said control disk and extending around and clear of the rim of said disk; a fixed member disposed in front of said disk and connected to said bracket to resist rotation; a rotatable member mounted on said shaft in front of said fixed member and manually engageable to operate said shaft; means between said members including elements on said rotatable member operable to turn said rotatable member a predetermined amount relative to said fixed member, thereby to advance said station selector shaft from station-to-station; and a pull cord attached to said means to operate said means from a remote point.

3. A remote control mechanism for the station selector shaft of a television receiver, comprising: a fixed member through which said shaft penetrates a rotatable member mounted on said shaft in front of said fixed member and manually engageable to operate said shaft; means between said members, including elements on said rotatable member, operable to turn said rotatable member a predetermined amount relative to said fixed member, thereby to advance said station selector shaft from station-to-station; a pull cord attached to said means to operate said means from a remote point; and a spring operable in opposition to said pull cord and normally restraining said means from operative connection with said elements of the rotatable member.

4. A remote control mechanism for the station selector shaft of television receivers wherein said shaft protrudes from the receiver cabinet through a control disk, said mechanism comprising: a bracket adapted for attachment to said television receiver cabinet behind said control disk and extending around and clear of the rim of said disk; a fixed member disposed in front of said disk and connected to said bracket to resist rotation; a rotatable member mounted on said shaft in front of said fixed member and manually engageable to operate said shaft; means between said members, including elements on said rotatable member, operable to turn said rotatable member a predetermined amount relative to said fixed member, thereby to advance said station selector shaft from station-to-station; a pull cord attached to said means to operate said means from a remote point; and a spring operable in opposition to said pull cord and normally restraining said means from operative connection with said rotatable member.

5. A remote control mechanism for television receivers as set forth in claim 1, wherein: said rotatable member is provided with a ratchet, and said means includes a lever pivotally connected to said fixed member and engageable with said ratchet.

6. A remote control mechanism for television receivers as set forth in claim 2, wherein: said elements are teeth of a ratchet, and said means includes a lever pivotally connected to said fixed member and engageable with said ratchet.

7. A remote control mechanism for television receivers as set forth in claim 3, wherein: said elements are teeth of a ratchet, and said means includes a lever pivotally connected to said fixed member and engageable with said ratchet.

8. A remote control mechanism for television receivers as set forth in claim 1, wherein: said elements are teeth of an integral gear carried by said rotatable member, and said means includes an idler gear supported by said fixed member, a pinion gear journalled concentrically with said selector shaft, a lever engageable with said pinion gear, and a support for said lever movable about the axis of said pinion gear, said lever protruding radially from between said members.

9. A remote control mechanism for television receivers as set forth in claim 2, wherein: said elements are teeth of an internal gear carried by said rotatable member, and said means includes an idler gear supported by said fixed member, a pinion gear journalled concentrically with said selector shaft, a lever engageable with said pinion gear, and a support for said lever movable about the axis of said pinion gear, said lever protruding radially from between said members.

10. A remote control mechanism for television receivers as set forth in claim 3, wherein: said elements are teeth of an internal gear carried by said rotatable member, and said means includes an idler gear supported by said fixed member, a pinion gear journalled concentrically with said selector shaft, a lever engageable with said pinion gear, and a support for said lever movable about the axis of said pinion gear, said lever protruding radially from between said members.

References Cited in the file of this patent

UNITED STATES PATENTS 2,111,694 Schroder -------------- Mar. 22, 1938